Feb. 7, 1928.
H. A. STEVENS
LINE FINDER
Filed Nov. 4, 1926
1,658,499
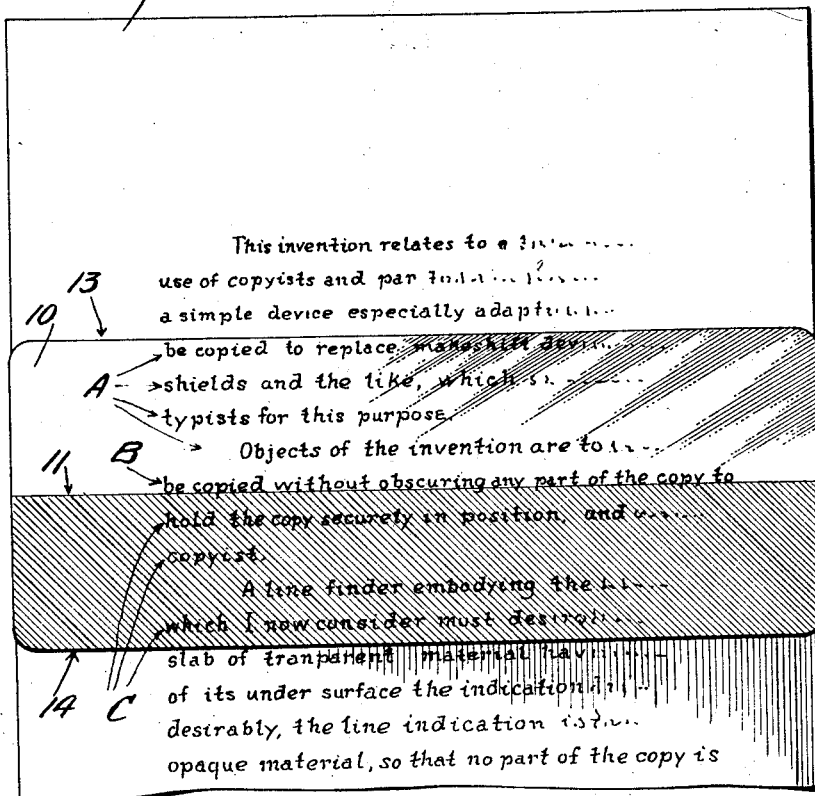
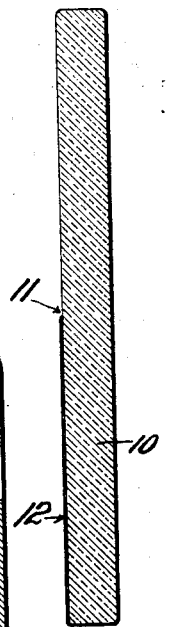
INVENTOR
Herbert A. Stevens
BY Robert W Byerly
ATTORNEY Patented Feb. 7, 1928

1,658,499

UNITED STATES PATENT OFFICE.

HERBERT A. STEVENS, OF ENGLEWOOD, NEW JERSEY.

LINE FINDER.

Application filed November 4, 1926. Serial No. 146,104.

This invention relates to a line finder for the use of copyists and particularly typists, and aims to provide a simple device especially adapted for indicating the line to be copied, to replace such makeshift devices as rulers, eraser shields and the like, which have heretofore been used by typists for this purpose.

Objects of the invention are to indicate a line to be copied without obscuring any part of the copy, to hold the copy securely in position, and to rest the eyes of the copyist.

A line finder embodying the invention in a form which I now consider most desirable consists of a massive slab of transparent material having on an intermediate part of its under surface the indication of a line. Most desirably, the line indication is made without the use of any opaque material, so that no part of the copy is obscured, but the use of a thin line indication of opaque material, which obscures only a small part of the copy is within the contemplation of the invention.

Illustrative embodiments of the invention are shown in the accompanying drawings:

Fig. 1 is a top view of the preferred form of line finder in operative relation to a sheet of copy.

Fig. 2 is a sectional end elevation of the line finder shown in Fig. 1, on a larger scale.

In the sectional view, Fig. 2, the thickness of the layer 12 (hereinafter referred to) is exaggerated for the sake of clearness, since, as a matter of fact, this layer is so thin that it does not project sensibly from the surface to which it is applied.

The line finder shown in Figs. 1 and 2 consists of a piece 10 of plate glass having near the middle of its under surface a line indication 11, which is provided by covering about one-half of the under surface with a thin layer 12 of transparent coloring material, such as green French varnish. The width of the piece 10 is at least as great as the length of the lines A, B, C on the copy D, while the height of the piece is sufficient to enable several lines of the copy to be seen through it. The thickness of the piece is sufficient to give it weight enough to hold a sheet of paper in position when placed upon it. I have found a thickness of 1/4" satisfactory.

In the use of the device, it is placed upon the copy D with the line indication 11 just below the line B which is to be copied, and is moved down over the copy as each line is copied. Since all parts of the piece 10 are transparent, the copyist may, if necessary, look back at the lines A or ahead at the lines C on the copy without moving the device. A further advantage of the complete transparency is that the device, unlike the make-shift line finders heretofore used, does not obscure any interlineations in the copy.

Since the line indication 11 is at or near the middle of the piece 10 and consequently at some distance from its upper and lower edges 13, 14, such refraction as occurs at these edges, in no way interferes with the copyist's view of the line B of the copy which is at the line indication 11, nor of the lines A immediately above and the lines C immediately below.

An important advantage of the device, which was ascertained by actual use, is that it rests the eyes of the copyist. This is because the glass filters out the infra-red and ultra-violet rays, which cause eye strain. As the light which reaches the eyes of the copyist has to pass twice through the glass, and as the glass is thick, the filtering effect is considerable.

The particular device described may be modified without departing from the invention. Thus the line indication 10 may be produced by treating both parts or either part of the lower surface of the glass in any way to give them a difference in appearance without interfering with their transparency. Thus the portion of the lower surface of the glass, which is covered by the layer 12 in the device illustrated in Figs. 1 and 2, may instead be etched with an acid to an extent which gives it a whitish appearance without making it obscure the copy when placed directly upon the copy.

What I claim is:

1. A line finder, comprising a piece of transparent material and transparent means giving a portion of the piece at one side of an intermediate straight line a color different from that of the portion at the other side thereof to provide a line indication.

2. A line finder for the use of copyists, comprising a slab of transparent material and transparent means giving a portion of one surface of the slab at one side of an intermediate straight line an appearance different from that of the portion at the other side thereof to provide a line indication.

3. A line finder, comprising a piece of plate glass having on one of its surfaces a layer of transparent coloring matter terminating at a straight line spaced from the edges of the piece.

In testimony whereof I have hereunto set my hand.

HERBERT A. STEVENS.